United States Patent [19]

Batt et al.

[11] 4,137,138

[45] Jan. 30, 1979

[54] RADIATION CURABLE COMPOSITIONS

[75] Inventors: Colin B. Batt, Acton; Helena Z. Kucharska, Weston; Arie Jansen, Rexdale, all of Canada

[73] Assignee: Reichhold Chemicals Limited, Islington, Canada

[21] Appl. No.: 628,782

[22] Filed: Nov. 4, 1975

[30] Foreign Application Priority Data

Nov. 7, 1974 [CA] Canada .................................. 213193

[51] Int. Cl.$^2$ .......................... C08F 8/30; C08G 63/76
[52] U.S. Cl. ................................ 204/159.18; 106/20; 204/159.19; 427/36; 427/44; 427/54; 428/537
[58] Field of Search ........................ 428/430; 428/458; 428/480; 204/159.18, 159.19, 159.11; 260/75 UA, 868, 857, 836, 837, 75 T, 75 N

[56] References Cited

U.S. PATENT DOCUMENTS

| | | | |
|---|---|---|---|
| 3,182,040 | 5/1965 | Watkins, Jr. et al. | 260/75 T |
| 3,663,558 | 5/1972 | Murayama et al. | 260/297 R |
| 3,721,617 | 3/1973 | Watt | 204/159.11 |
| 3,804,800 | 4/1974 | Knowles | 260/45.75 R |
| 3,933,735 | 1/1976 | Murayama et al. | 260/45.8 N |
| 3,951,908 | 4/1976 | Kaiser et al. | 260/45.7 P |

*Primary Examiner*—Murray Tillman
*Assistant Examiner*—Thurman K. Page
*Attorney, Agent, or Firm*—Larson, Taylor and Hinds

[57] ABSTRACT

Novel radiation curable compositions incorporating a mixture of: 1. Unsaturated polyester prepared from polyhydric alcohol, unsaturated dicarboxylic acid and with or without saturated dicarboxylic acid, or unsaturated ether type polyester prepared for polyglycidyl ether and unsaturated monocarboxylic acid with 2. Saturated monomer of lactone or lactam type. The above compositions are cured with or without radiation sensitive additive and are useful in coating or printing ink applications.

22 Claims, No Drawings

RADIATION CURABLE COMPOSITIONS

BACKGROUND OF THE INVENTION

Prior art in radiation curable compositions describes systems based on the one, two or more unsaturated components, i.e. maleinized drying and semi drying oils, epoxidised and acrylated drying and semi drying oils, acrylated epoxy resins, unsaturated polyesters, monomeric or oligomeric unsaturated esters; i.e. the systems consist of ethylenically unsaturated material polymerizable when exposed to radiation such as ultra violet light, electron beam or gamma radiation. All of these systems have an advantage over conventional coatings and printing inks in the fact that no volatile non-reactive solvents are used, hence pollution problems are eliminated but most of these suffer from disadvantages of high cost, instability or slowness of cure.

BRIEF SUMMARY OF THE INVENTION

This invention relates to radiation curable compositions in particular to compositions based on ethylenically unsaturated compounds and saturated reactive compounds. The composition of the present invention are converted to polymers on exposure to radiation such as ultra violet light, electron beam or gamma radiation. These compositions shall be referred to as radiation polymerizable compositions.

DETAILED DESCRIPTION OF THE INVENTION

Thus this invention comprises a radiation polymerizable composition comprising a mixture of: (a) an unsaturated polyester derived from a polyhydric alcohol and an unsaturated dicarboxylic acid containing a single ethylenic bond, or (b) an unsaturated polyester derived from a polyhydric alcohol, an unsaturated dicarboxylic acid containing one ethylenic bond, and a saturated dicarboxylic acid, or saturated dicarboxylic acid anhydride or (c) an unsaturated ether-type polyester derived from polyglycidyl ether and an unsaturated mono carboxylic acid with a saturated reactive monomeric lactone or lactam.

Preferably the polyhydric alcohol is chosen from ethylene, propylene, butylene and diethylene glycols; trimethyl propanediol; neopentyl glycol; ester-diols, glycerol, trimethylol propane, and pentaerythritol.

It is also contemplated that a mixture of two or more polyhydric alcohols can be used. Preferably the unsaturated dicarboxylic acid is chosen from maleic acid; fumaric acid; itaconic acid; citraconic acid; or mesaconic acid.

It is also contemplated that a mixture of two or more unsaturated dicarboxylic acids can be used.

Preferably the saturated dicarboxylic acid or acid anhydride is a substituted or unsubstituted aromatic acid or acid anhydride, typically chosen from the group comprising phthalic acid; phthalic anhydride; isophthalic acid, terephthalic acid; tetrahydrophthalic acid; tetrabromophthalic acid; and tetrachlorophthalic acid. Alternatively an aliphatic dicarboxylic acid of general formula $HO_2C(CH_2)_nCO_2H$, wherein n lies between 2 and 20 inclusive may be used.

It is also contemplated that a mixture of two or more acids, or acid anhydrides, or acids and acid anhydrides, may be used.

Conveniently the composition can also contain in addition a photo-initiator. Preferably such an initiator is chosen from acetophenone, benzophenone, or benzoin and derivatives thereof, such as the mixture of benzoin methyl and ethyl ethers sold under the trade name Trigonal - 14. Alternatively, the photoinitiator can be chosen from halogenated aliphatic, alicyclic and aromatic hydrocarbons, wherein the halogen may be chlorine, bromine or iodine.

Preferably the lactone or lactam has the general formula I

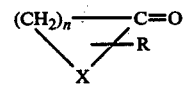

in which: X represents oxygen or nitrogen; n has the values 3, 4, 5 or 6; R represents halogen; nitro; or an alkyl group of 1–12 carbons may be linear, branched or cyclic. Preferably the lactam has a 5 or 6 membered ring, corresponding to n having the values 3 or 4. Conveniently the lactone or lactam is chosen from propiolactone; β-butyrolactone; γ-butyrolactone; caprolactone; pyrrolidinone; piperidone, caprolactam, or substituted derivatives thereof.

Preferably the lactone or lactam is chosen from γ-butyrolactone, caprolactam, or pyrrolidinone.

It is also contemplated that a mixture of one or more lactone or one or more lactam or a mixture of lactones and lactams may be used. Preferably the composition contains between 10% and 90% by weight of unsaturated polyester, especially 65 to 80%, and from 90 to 10% by weight, especially 35 to 20%, of lactam, the percentage being expressed on the total of polyester and lactone and/or lactam present.

The composition according to this invention have several uses. They can advantageously be incorporated in film forming coatings. Advantageously these coatings can also contain pigments.

They may also be used in the formulation of printing ink vehicle systems, or in the formulation of a printing ink which contains pigments.

In the embodiment of the present invention, the radiation polymerizable composition may include accelerators, chain transfer agents, stabilizers, viscosity modifiers, wetting agents, and anti-mist agents to improve the handling properties of the coating or printing ink composition.

Preferably the polyester used in compositions according to this invention has an acid number of less than 51, a hydroxyl number of less than 100, and a molecular weight of between 500 and 5000.

Suitable unsaturated ether type polyester may be prepared from epoxy precursor and the suitable starting materials can include but are not limited to diglycidyl ether bisphenol A base and resins thereof, these compositions modified further with reactive diluents such as monofunctional epoxides, i.e. glycidyl methacrylate, allyl glycidyl ether, butyl glycidyl ether, phenyl glycidyl ether, cyclohexane vinyl monoxide, γ-pinene oxide etc. and difunctional epoxides, i.e. diglycidyl ether, butadiene dioxide, divinyl benzene dioxide, diethylene glycol diglycidyl ether etc. coreacted with ethylenically unsaturated monocarboxylic acids such as acrylic, methacrylic or ethacrylic acid.

The drying rate of the radiation polymerizable composition will vary with the specific ingredients of the composition, concentration of the photosensitizer, thickness of the film, nature and intensity of the radiation, source and its distance from the film, presence or absence of oxygen and ambient temperature. The thickness of the film may range from 0.5 to 200 microns.

Any suitable source of radiation may be used such as 100 or 200 watt Hanovia mercury arc quartz ultra violet lamp, a 300,000 volt linear electron accelerator or a gamma radiation emitter such as cobalt 60.

The radiation polymerizable compositions of the present invention may be utilized as coatings, clear and pigmented on metal, glass, plastic, paper, textiles and wood applied by conventional methods such as roller, curtain, spray or dip coating.

The composition of the present invention may also be used as adhesive particularly in laminating applications where one lamina is translucent when ultra violet light is used; when electron beam or gamma radiation is used at least one lamina must be capable of transmitting the radiation.

The radiation polymerizable compositions of this invention can be used as vehicles for inks. These can be pigmented and treated with other additives and modifiers the nature of which are known to those skilled in the printing ink art. The inks can be used in lithographic, letter-press or screen applications to paper, plastic, metal plate and foil, wood, glass and textiles.

The coatings, adhesives and printing inks prepared from the compositions of this invention exhibit very good colour in unpigmented films; very high gloss, adhesion, flexibility, chemical and mar resistance. The uncured compositions have very low odour and exhibit great ease of application. The films are fast drying, the times often being less than ½ second and up to 10 seconds, depending on the energy source and equipment used, and the composition and thickness of the film.

The invention and its advantages will be better understood with reference to the following illustrative examples, but is not intended to be limited thereto. In the examples, the parts are given by weight unless otherwise specified. The ingredients of the compositions are mixed thoroughly and cured as films. Curing was carried out using a Hanovia laboratory model 45080 ultra violet curing system, which consists of a 2400 watt 12 inch medium pressure mercury vapour lamp in a housing over a conveyor system. The ultra violet lamp is made from pure fused quartza and designed to operate at 200 watts per linear inch. The vertical adjustment between the conveyor system and the lamp was set at the number two position, and the conveyor speed set at 100 feet/minutes. Samples were passed through the system sufficient times to obtain an acceptable cure. In the Examples this is calculated out to a total time of exposure.

EXAMPLES (1) Unsaturated polyester preparation

Into a suitable reaction vessel equipped with stirrer, fractionating column temperature controller and inert gas inlet, were charged polyol, unsaturated diacid, and saturated diacid, the mixture heated to 235° C. and held until acid number of 25 or below and hydroxyl number of 100 or below are attained. (1a) Diethylene glycol (2.3 mole), phthalic anhydride (1.2 mole), adipic acid (0.5 mole) and maleic anhydride (0.5 mole) were reacted until acid number of 20 and hydroxyl number of 50. (1b) Diethylene glycol (2.3 mole), phthalic anhydride (1.25 mole), adipic acid (0.5 mole) and fumaric acid (0.5 mole) were reacted until acid number of 15 and hydroxyl number of 50. (1c) Diethylene glycol (1.2 mole), propylene glycol (0.75 mole), phthalic anhydride (0.37 mole), adipic acid (0.5 mole) and fumaric acid (0.5 mole) were reacted until acid number of 10 and hydroxyl number of 25. (1d) propylene glycol (0.5 mole), ethylene glycol (1.3 mole), phthalic anhydride (0.5 mole), adipic acid (0.75 mole) and maleic anhydride were reacted until acid number of 25. (1e) Ethylene glycol (1.65 mole), adipic acid (1.1 mole) and maleic anhydride were reacted until acid number of 25 and hydroxyl number of 30. (1f) Diethylene glycol (1.8 mole, isophthalic acid (0.75 mole), adipic acid (0.5 mole) and maleic acid (0.5 mole) were reacted until acid number of 20. (1g) Diethylene glycol (1.8 mole), isophthalic acid (0.5 mole), adipic acid (0.5 mole) and maleic anhydride 0.75 mole) were reacted until acid number of 25. (1h) Diethylene glycol (1.8 mole), isophthalic acid (0.37 mole), adipic acid (0.37 mole and maleic anhydride (1.0 mole) were reacted until acid number of 25. (1i) Diethylene glycol (1.8 mole), phthalic anhydride (0.75 mole), adipic acid (0.5 mole) and maleic anhydride (0.5 mole) were reacted until acid number of 20. (1j) Diethylene glycol (1.75 mole), phthalic anhydride (0.87 mole), adipic acid (0.37 mole) and itaconic acid (0.5 mole) were reacted until acid number of 20 and hydroxyl number of 80.

(2) Unsaturated ether type polyester preparation

Into a suitable reaction vessel equipped with stirrer, condenser, temperature controller and addition funnel, epoxy precursor and catalyst were charged, the temperature raised to 60–85° C. and the unsaturated acid added over a period of ¼–½ hour. The mixture was held at 60–85° C. until the acid number of 0–30 was obtained.

2a. Diglycidyl ether of bisphenol A (eg. Shell's epon (trademark) 815), epoxy equivalent of 180–195 (1 mole) tetramethylammonium hydroxide (1% on epoxy and acrylic acid) were reacted until acid number of 25 was obtained.

2b. Diglycidyl ether of bisphenol A (eg. Shell's Epon (trademark) 828) 1 mole, tetramethylammonium hydroxide 1% on epoxy and methacrylic acid 1 mole were reacted until acid number of 25 was obtained.

(3) Preparation of clear coatings

Unsaturated resins from example 1 and 2 were converted into clear coatings by combining the resin with (a) lactone and (b) lactam according to the following formulation:

Polyester — 75

Lactone (γ-butyrolactone) or Lactam (pyrrolidinone) — 25

Photosensitizer — 5 or 0

The ingredients were blended until uniform and 10 micron uniform films or 0.5–25 micron wedge films were prepared by means of casting into a Nappiri finess-of-grind gauge. The cure characteristics of the films are shown in Table 1.

Table 1

| Polyester | Film Thickness (Microns) | Lactam (γ-Butyrolactone) Photoinitiator | | Lactone (Pyrrolidinone) Photoinitiator | |
|---|---|---|---|---|---|
| | | Present Cure time (seconds) | Absent Cure time (seconds) | Present Cure time (seconds) | Absent Cure time (seconds) |
| 1a | 10 | 1.2 | .35 | 1.2 | .35 |
| b | 10 | 1.0 | .3 | 1.2 | .3 |
| c | 10 | 1.2 | .35 | 1.2 | .35 |
| d | 10 | 3.7 | 1.2 | 3.7 | 1.5 |
| e | 10 | .75 | 2.2 | .75 | .35 |
| f | 10 | .35 | .1 | .5 | .25 |
| g | 10 | .35 | .1 | .5 | .25 |
| h | 10 | 1.2 | .35 | 1.2 | .35 |

Table 1-continued

| Polyester | Film Thickness (Microns) | Lactam (γ-Butyrolactone) Photoinitiator | | Lactone (Pyrrolidinone) Photoinitiator | |
|---|---|---|---|---|---|
| | | Present Cure time (seconds) | Absent Cure time (seconds) | Present Cure time (seconds) | Absent Cure time (seconds) |
| j | 10 | 2.6 | 1.2 | 3.0 | 1.2 |
| 2a | .5–25 | .15 | .1 | .15 | .1 |
| b | .5–25 | 1.9 | .75 | 2.4 | 1.2 |

(4) Preparation of pigmented coatings

Pigmented coatings were prepared from the unsaturated polyesters and lactone or lactam according to the following formulation using resins from example 1 and 2:

Polyester — 65
Pyrrolidinone — 20
Photosensitizer (Trigonal-14) — 5
Pigment — 10

The ingredients were blended on a 3 roll mill until uniform and films prepared as in example (3). Films laid down by I.G.T. print tester from a rubber offset blanket. The pigments used were (a) Phthalo blue (b) Lithol blue and (c) Benzidine yellow. The cure characteristics are shown in Table II.

Table II

| Polyester | Pigment / Cure time sec. | | |
|---|---|---|---|
| | Phthalo-blue sec | Lithol Rubin sec | Benzidine Yellow |
| 1a | .75 | .35 | .45 |
| g | .75 | .35 | .45 |
| h | .82 | .52 | .52 |
| i | .75 | .37 | .45 |

Film thickness: 10 microns (5) Preparation of printing ink.

Printing ink was prepared from the unsaturated polyester and lactone or lactam and pigment according to the following formulation using resins from examples 1 and 2.

| Polyester | 62% |
| Lactam | 18% |
| Photosensitizer | 5% (Trigonal-14) |
| Pigment | 15% |

The ingredients were combined on a conventional 3 roll mill until uniform and the resulting ink was tested for performance, films prepared as before. The compositions used and their cure characteristics are shown in Table III.

Table III

| Polyester | Pigment / Cure time sec. | | |
|---|---|---|---|
| | phthalo-blue | Lithol Rubine | Benzidine Yellow |
| 1a | .9 | .37 | .6 |
| g | .9 | .45 | .74 |
| h | .9 | .37 | .73 |
| i | .9 | .37 | .6 |

What we claim as our invention is:

1. A radiation-polymerizable composition comprising a mixture of components A and B, in which component A is chosen from
    (a) an unsaturated polyester derived from a polyhydric alcohol and an unsaturated dicarboxylic acid or an unsaturated dicarboxylic acid anhydride containing a single ethylenic bond; or
    (b) an unsaturated polyester derived from a polyhydric alcohol, an unsaturated dicarboxylic acid or an unsaturated dicarboxylic acid anhydride containing one ethylenic bond, and a saturated dicarboxylic acid or saturated dicarboxylic acid anhydride; or
    (c) an unsaturated polyester derived from a polyglycidyl ether and an unsaturated monocarboxylic acid; and in which component B represents at least one saturated monomeric lactone or lactam of general formula I

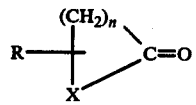

in which formula X represents oxygen or an imino (—NH—) group; n is an integer selected from the group comprising the numbers 3, 4, 5, and 6; and R represents hydrogen, or an alkyl group containing 1 to 12 carbon atoms and may be branched, linear or cyclic in configuration, said composition containing from 10% to 90% by weight of component A and from 90% to 10% by weight of component B, based on the total weight of polyester, and lactone, and/or lactam present.

2. composition according to claim 1 wherein component A is chosen from
    (a) an unsaturated polyester derived from a polyhydric alcohol and an unsaturated dicarboxylic acid or an unsaturated dicarboxylic acid anhydride containing a single ethylenic bond; or
    (b) an unsaturated polyester derived from a polyhydric alcohol, an unsaturated dicarboxylic acid or an unsaturated dicarboxylic acid anhydride containing one ethylenic bond, and a saturated dicarboxylic acid or saturated dicarboxylic acid anhydride, wherein said polyhydric alcohol is chosen from at least one of the group consisting of ethylene glycol; propylene glycol; butylene glycol; diethylene glycol; trimethyl propane diol; ester diols; glycerol; trimethylol propane, and pentaerythritol.

3. Composition according to claim 1 wherein component A is chosen from
    (a) an unsaturated polyester derived from a polyhydric alcohol and an unsaturated dicarboxylic acid or an unsaturated dicarboxylic acid anhydride containing a single ethylenic bond; or
    (b) an unsaturated polyester derived from a polyhydric alcohol, an unsaturated dicarboxylic acid containing one ethylenic bond, and a saturated dicarboxylic acid or saturated dicarboxylic acid anhydride,
wherein said unsaturated dicarboxylic acid comprises at least one acid chosen from the group consisting of maleic acid; fumaric acid; itaconic acid; citraconic acid and mesaconic acid.

4. Composition according to claim 1 wherein component A comprises an unsaturated polyester derived from a polyhydric alcohol, an unsaturated dicarboxylic acid or an unsaturated dicarboxylic acid anhydride containing one ethylenic bond, and a saturated dicarboxylic acid, the said saturated dicarboxylic acid being a substituted or unsubstituted aromatic dicarboxylic acid or anhydride.

5. Composition according to claim 4 wherein the saturated dicarboxylic acid or acid anhydride is chosen from the group consisting of phthalic acid; phthalic anhydride; isophthalic acid; terephthalic acid; tetrahydrophthalic acid; tetrabromophthalic acid; and tetrachlorophthalic acid.

6. Composition according to claim 1 wherein component A comprises an unsaturated polyester derived from a polyhydric alcohol, an unsaturated dicarboxylic acid containing one ethylenic bond, and a saturated dicarboxylic acid, the said saturated dicarboxylic acid being an aliphatic dicarboxylic acid of general formula [HO$_2$C(CH$_2$)$_n$CO$_2$H] HO$_2$C(CH$_2$)$_m$CO$_2$H, wherein m is an integer from 2 to 20.

7. Composition according to claim 4 wherein a mixture of two or more acids, or acid anhydrides, or acids and acid anhydrides is used.

8. A film forming coating incorporating a composition according to claim 1.

9. A printing ink vehicle incorporating a composition according to claim 1.

10. Composition according to claim 1 containing in addition a photo-initiator.

11. Composition according to claim 10 wherein the photoinitiator is chosen from at least one of the group consisting of: acetophenone, benzophenone, and benzoin, and derivatives thereof.

12. Composition according to claim 11 wherein the photoinitiator is a mixture of benzoin methyl and ethyl ethers.

13. Composition according to claim 10 wherein the photoinitiator is chosen from at least one of the group consisting of halogenated aliphatic, alicyclic and aromatic hydrocarbons wherein the halogen is chlorine, bromine or iodine.

14. A printing ink incorporating a composition according to claim 1.

15. Composition according to claim 1 containing as component B a lactone or lactam having a 5 or 6 membered ring.

16. Composition according to claim 1 wherein the lactone or lactam is chosen from at least one member of the group consisting of propiolactone; β-butyrolactone γ-butyrolactone; caprolactone; 2-pyrrolidinone; 2-piperidone; and caprolactam.

17. Composition according to claim 16 wherein the lactone or lactam is chosen from at least one of the group consisting of γ-butyrolactone, caprolactam, and pyrrolidinone.

18. Composition according to claim 1 containing as component B a mixture of lactones, a mixture of lactams, or a mixture of lactones and lactams.

19. An adhesive system incorporating a composition according to claim 1.

20. Composition according to claim 1 containing as component A from 65% to 80% polyester by weight, based on the polyester, and lactone and/or lactam present.

21. Composition according to claim 1 wherein component A is a polyester having an acid number of less than 51, a hydroxyl number of less than 100, and a molecular weight between 500 and 5000.

22. A film forming coating according to claim 8 containing a pigment.